(12) United States Patent
Shrock (10) Patent No.: US 11,993,336 B1
(45) Date of Patent: May 28, 2024

(54) SUSPENSION AND STEERING FOR A MOTORIZED CYCLE

(71) Applicant: Ray R. Shrock, North Branch, MN (US)

(72) Inventor: Ray R. Shrock, North Branch, MN (US)

(*) Notice: Subject to any disclaimer, the term of this patent is extended or adjusted under 35 U.S.C. 154(b) by 0 days.

(21) Appl. No.: 18/504,862

(22) Filed: Nov. 8, 2023

Related U.S. Application Data (60) Provisional application No. 63/423,701, filed on Nov. 8, 2022.

(51) Int. Cl.
| | | |
|---|---|---|
| *B62K 21/00* | (2006.01) |
| *B62K 5/027* | (2013.01) |
| *B62K 5/05* | (2013.01) |
| *B62K 25/04* | (2006.01) |

(52) U.S. Cl.
CPC .......... *B62K 21/00* (2013.01); *B62K 5/027* (2013.01); *B62K 5/05* (2013.01); *B62K 25/04* (2013.01)

(58) Field of Classification Search
CPC .......... B62K 21/00; B62K 5/027; B62K 5/05; B62K 25/04
See application file for complete search history.

(56) References Cited

U.S. PATENT DOCUMENTS

| | | |
|---|---|---|
| 5,431,243 A | 7/1995 | Richards |
| 7,264,251 B2 | 9/2007 | Marcacci |
| 7,494,141 B2 | 2/2009 | Bouton |
| 7,568,541 B2 | 8/2009 | Pfeil et al. |
| 8,840,131 B1 | 9/2014 | Calley |
| 8,991,542 B2 | 3/2015 | Yu |
| 9,227,662 B2 | 1/2016 | Bartolozzi et al. |
| 9,527,543 B2 | 12/2016 | Mercier |
| 10,435,104 B2 | 10/2019 | Abbott et al. |
| 10,676,148 B1 | 6/2020 | Frohnmayer |
| 10,967,929 B2 | 4/2021 | Brudeli |
| 2013/0056287 A1 | 3/2013 | Park et al. |
| 2021/0331762 A1 | 10/2021 | Mighell et al. |

FOREIGN PATENT DOCUMENTS

| | | | |
|---|---|---|---|
| CN | 105377683 A | * 3/2016 | ............. B62J 35/00 |
| CN | 107878642 A | * 4/2018 | ............. B62K 5/05 |

(Continued)

OTHER PUBLICATIONS

The Roadster—Ultra Efficient Electric Vehicles. https://www.arcimoto.com/ [Date accessed: May 6, 2022].

(Continued)

*Primary Examiner* — Drew J Brown
(74) *Attorney, Agent, or Firm* — Bold IP, PLLC; Binita Singh (57) ABSTRACT

A vehicle that provides for a suspension assembly that can articulate independent of a lean angle of a vehicle frame is disclosed. The vehicle includes a non-steering suspension assembly and a steering suspension assembly. The steering suspension assembly is connected to at least one wheel wherein the wheel can articulate left and right to steer the vehicle. The non-steering suspension assembly is connected to two wheels which are on an opposite end of the vehicle frame from the steering suspension assembly. The two wheels are connected to a suspension beam such that each wheel can articulate up and down independent of each other. The two wheels connected to the suspension beam can lean as the vehicle frame leans and further the two wheels remain parallel to the vehicle frame when the vehicle frame tilts.

19 Claims, 5 Drawing Sheets

(56) References Cited

FOREIGN PATENT DOCUMENTS

| CN | 108116577 A | * | 6/2018 | ............. B62K 21/10 |
| CN | 109436157 A | * | 3/2019 | ............... B62K 5/05 |
| DE | 102020203413 A1 | * | 10/2020 | ............ B60W 30/02 |
| JP | 2010228551 A | * | 10/2010 | |
| JP | 2020040456 A | * | 3/2020 | ............. B62K 5/027 |
| WO | 2013051194 A1 | | 4/2013 | |
| WO | WO-2015115108 A1 | * | 8/2015 | ............... B62H 1/04 |

OTHER PUBLICATIONS

"Rapid Responder," https://www.arcimoto.com/rapid-responder [Date accessed: May 6, 2022].

"Mean Lean Machine," https://www.arcimoto.com/mlm#intro [Date accessed: May 6, 2022].

"2024 Honda Neowing Concept Bike," youtube.com. https://www.youtube.com/watch?v=1XDtsJ41WJc [Date accessed: May 6, 2022].

"2024 CAN-AM Ryker," can-am.brp.com. https://can-am.brp.com/on-road/us/en/models/3-wheel-vehicles/ryker.html [Date accessed: May 6, 2022].

"2024 CAN-AM Spyder F3," https://can-am.brp.com/on-road/us/en/models/3-wheel-vehicles/spyder-f3.html [Date accessed: May 6, 2022].

"2024 CAN-AM Spyder RT," can-am.brp.com. https://can-am.brp.com/on-road/us/en/models/3-wheel-vehicles/spyder-rt.html [Date accessed: May 6, 2022].

"Rear Wheel Steering—Black Iron Horse Cargo Bike," youtube.com. https://www.youtube.com/watch?v=GXFT3YyEkkU [Date accessed: May 6, 2022].

\* cited by examiner

SUSPENSION AND STEERING FOR A MOTORIZED CYCLE

CROSS-REFERENCES TO RELATED APPLICATIONS

This application is a non-provisional application which claims priority to U.S. Provisional Application No. 63/423,701 filed on Nov. 8, 2022, which is incorporated by reference in its entirety.

FIELD OF THE INVENTION

The present invention relates to a suspension and steering system on a vehicle, and more particularly, this invention relates to a suspension and steering system on three-wheeled and four-wheeled vehicles that allows for full, independent, suspension articulation even at full tilt and full turn.

BACKGROUND

The development of improved means of transportation goes together with improvement of living quality. One such measure of improvement in living quality has to do with convenience, with a convenient means of transportation being a good example. Two-wheeled vehicles are becoming an important part of this conversation with them being one of the most convenient means of transportation. Two wheeled vehicles can include motorcycles, scooters, and bicycles which are widely used in daily life and offer more flexibility because of their size. As these vehicles continue to be used as a mode of transportation, their design parameters are being changed to a three-wheeled design. Generally, there is a trend toward developing three-wheeled motorcycles versus their counterpart, one front wheel and one rear wheel motorcycles. This general trend is attributed to three-wheeled motorcycles offering better stability and superior cornering abilities than their counterparts. Thus, three-wheeled motorcycles are regarded as a future trend in the market.

The development and design capabilities of tilting motorcycles can continue to be improved. Leaning vehicles can come in more than one front or rear wheels and include a frame that is pivotally connected to a two-wheel assembly that allows the vehicle to pivot at the connection. There are areas in the overall assembly that can be improved on. For example, the assembly has limited suspension movement which could benefit from an improvement.

Accordingly, there is still an unsolved need for an improved three-wheeled and/or four-wheeled vehicle to offer better suspension and maneuverability.

SUMMARY

The disclosed device is unique when compared with other known devices and solutions because it provides a structurally different mechanism for the front wheel suspension assembly offering better suspension movement of the front wheels which is independent of each other and independent of the lean. The disclosed device can be used in any motorized vehicles that include three wheels, and in some four-wheeled vehicles.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above, in this Detailed Description, the claims below, and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Referring now to the drawings and the following written description of the present invention, it will be readily understood by those persons skilled in the art that the present invention is susceptible to broad utility and application. Many embodiments and adaptations of the present invention other than those described herein, as well as many variations, modifications, and equivalent arrangements will be apparent from or reasonably suggested by the present invention and the detailed description thereof without departing from the substance or scope of the present invention. This disclosure is only illustrative and exemplary of the present invention and is made merely for purposes of providing a full and enabling disclosure of the invention.

The present disclosure is generally directed to one or more non-limiting embodiments of a leaning vehicle, which may be contemplated to include a three-wheeled leaning vehicle 100. It is contemplated that aspects of the three-wheeled leaning vehicle could be used with any three-wheeled motorized vehicle, such as a motorcycle, a scooter, an e-bike, or the like. It is contemplated that aspects of the three-wheeled vehicle 100 may also be used on a vehicle having more than three wheels (e.g., four wheeled vehicle) or a non-motorized vehicle (e.g., a three wheeled bicycle).

FIGS. 1-5 are illustrations of a non-limiting embodiment of the three-wheeled vehicle 100, which is an example of a three-wheeled vehicle that can allow a rider to lean or tilt with the vehicle while turning without urging the rider toward the outside of the turn. The three-wheeled vehicle 100 described in this embodiment provides for an improved suspension assembly that allows a suspension on each of the wheels to articulate independent of a lean angle while keeping one or more front wheels to remain parallel to a vehicle frame despite a lean angle of the frame. Additionally, the three-wheeled vehicle 100 described in this embodiment also provides for a steering assembly wherein a steering swing arm connects to a center section on a rear wheel to steer the vehicle.

Figure 1:
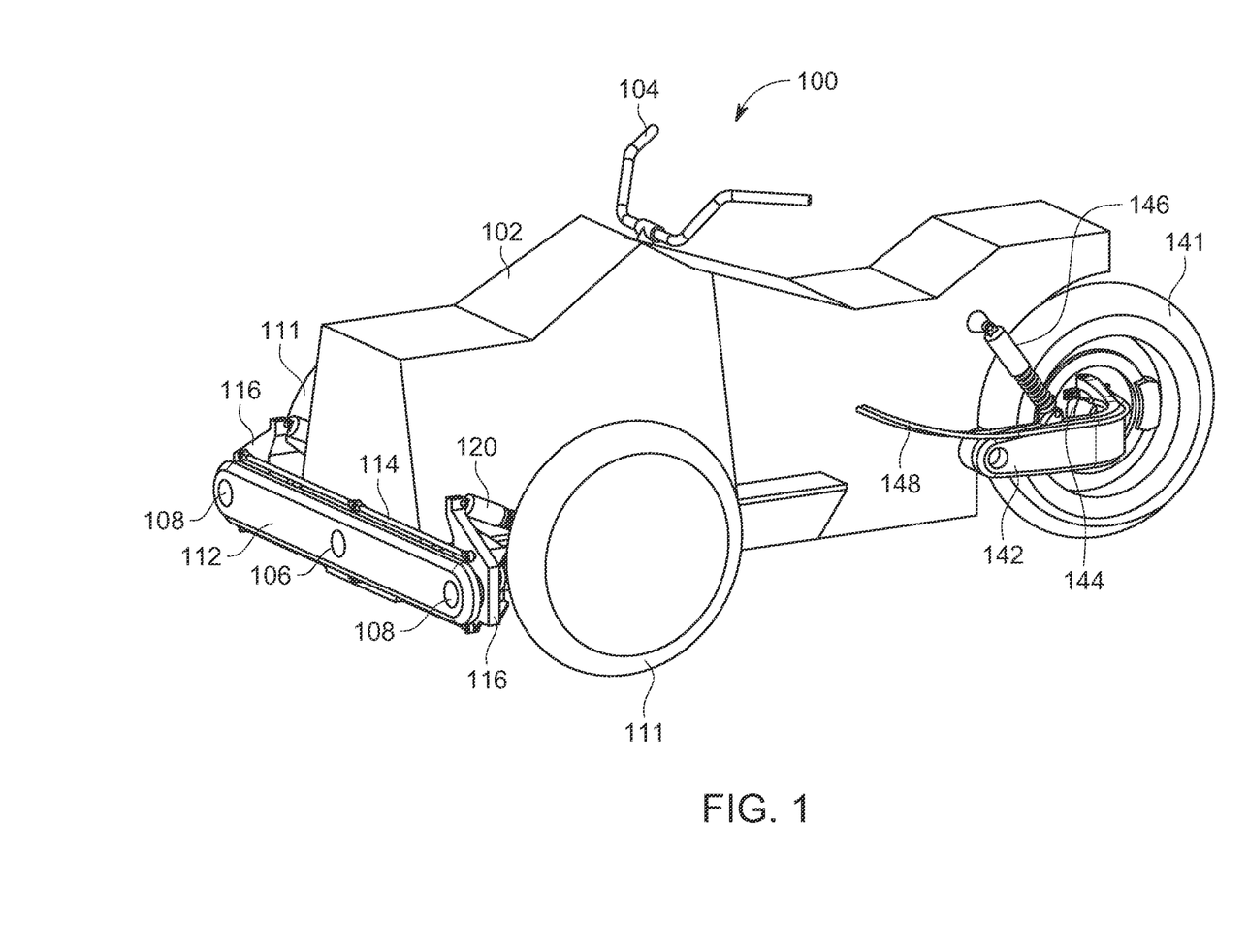
FIG. 1 is a pictorial illustration of a vehicle including steering and non-steering suspension assemblies in accordance with an illustrative embodiment.

FIG. 1 depicts a perspective view of a three-wheeled vehicle 100 including a frame 102, a non-steering suspension assembly, and a steering suspension assembly. As shown in the non-limiting illustration, the non-steering suspension assembly is shown associated with two front wheels, a first wheel 111 and a second wheel 111 disposed on either side of a longitudinal axis of the frame 102 (or on either side of the frame 102). The steering suspension assembly is shown connected at a back end of the vehicle 100 and associated with one wheel, referred to as a third wheel 141, which is disposed along a center line of the frame 102. In the illustration, it is shown that the non-steering suspension assembly, with the first and second wheels 111, is associated with a front end of the frame 102, and the steering suspension assembly 140, with the third wheel 141, is associated with a back end of the frame 102. It is to be understood that the non-steering suspension assembly and the steering suspension assembly 140 may be interchanged, wherein the non-steering suspension assembly may be included on the back end of the frame 102 associated with the third wheel 141, and the steering suspension assembly may be included on the front end of the frame 102 associating with the two front wheels 111. It is also to be understood that a four-wheel design can also include two wheels in the front and back of the frame. A steering control 104 is disposed through the frame 102 and operably connected to a wheel and/or wheels that are associated with the steering assembly. In the one or more embodiments shown, the steering control 104 is operably connected to the third wheel 141, wherein the steering control 104 operatively steers the vehicle 100.

Figure 2:
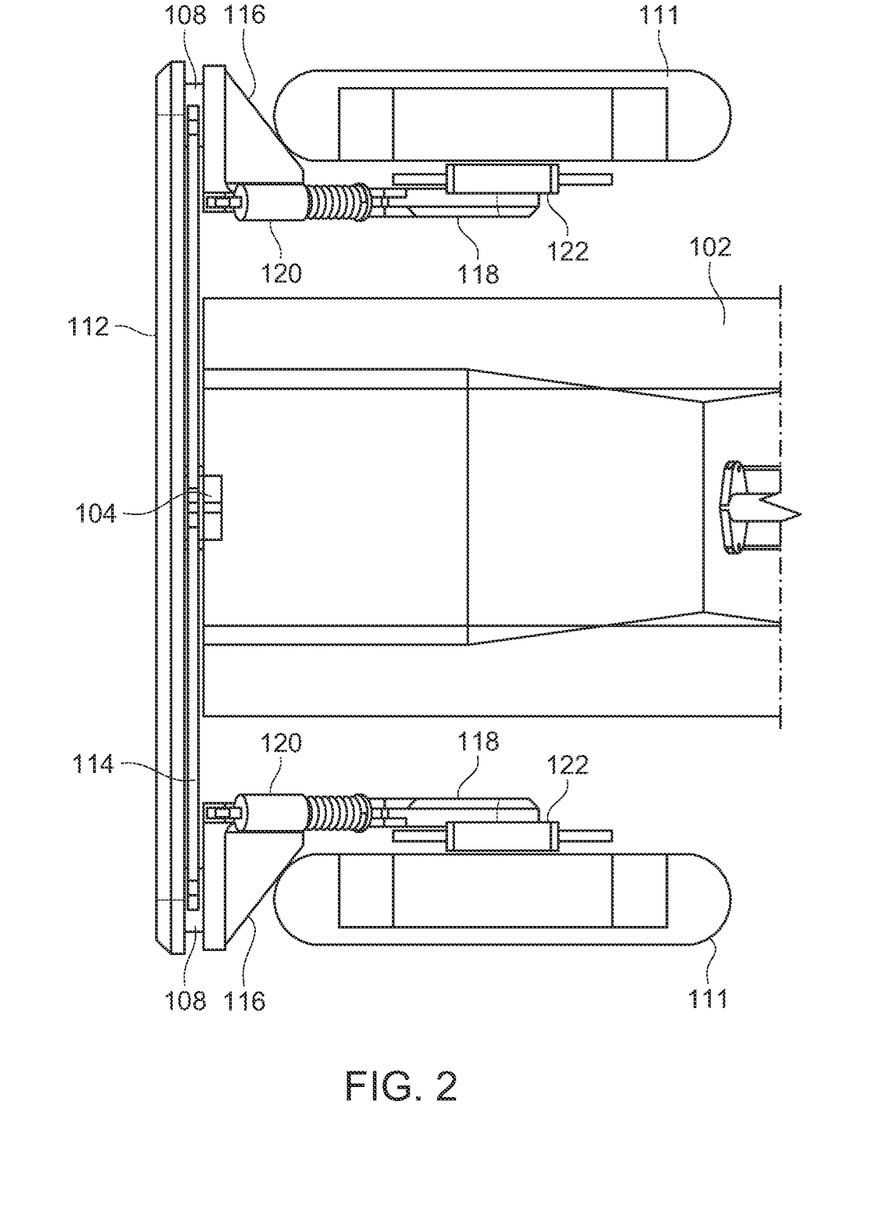
FIG. 2 is a pictorial illustration of a top view of a non-steering suspension assembly in accordance with an illustrative embodiment.
Figure 5:
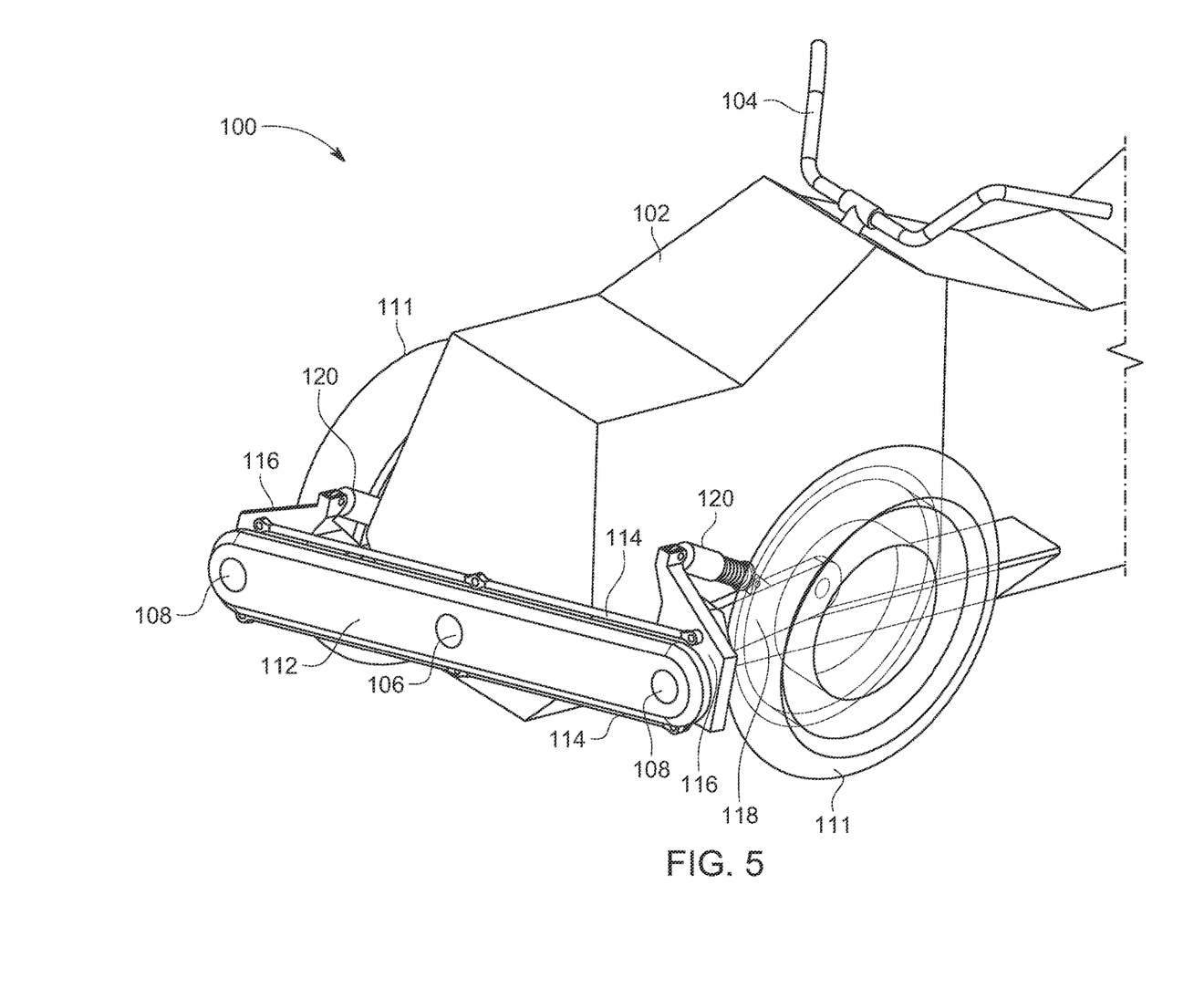
FIG. 5 is a pictorial illustration representing a tilt of the vehicle with the non-steering suspension at a front end of the vehicle assembly in accordance with an illustrative embodiment.

Referring to FIGS. 1, 2, and 5, a front end of the frame 102 is connected to a suspension beam 112 which is connected to a pair of pivot blocks 116. The front end of the frame 102 also includes one or more suspension tie rods 114 that are connected to the pair of pivot blocks 116. The suspension beam 112 can connect to the non-steering assembly or the steering assembly depending on whether the vehicle will be designed to be steered at the front end or at a back end. The following description and the illustrations shown will describe a front wheel drive vehicle with the non-steering assembly configured at the front end of the frame 102 and the steering suspension assembly at the back end of the vehicle 100. It is to be understood that alternatively the front end of the vehicle can be configured with the steering assembly and a person skilled in the arts will readily appreciate the feasibility of such.

Referring to FIGS. 1, 2, and 5, the non-steering suspension assembly includes a pair of fixed swing arms 118, and a pair of shock and spring suspensions 120. The non-steering suspension assembly is arranged to connect to the first wheel 111 and the second wheel 111 which are disposed on either side of a longitudinal axis of the frame 102. The suspension beam 112 is pivotally connected to a front of the frame 102 at a frame pivot point 106. The suspension beam 112 is also pivotally connected to each of the pivot blocks 116 at a block pivot point 108. Each pivot block of the pair of pivot blocks 116 is on either side of the longitudinal axis (or on either side of the frame 102) directly in front of the wheels 111. The pair of pivot blocks 116 are connected to the pair of fixed swing arms 118 and the pair of shock and spring suspensions 120. Each pivot block 116 of the pair of pivot blocks 116 has an extended section that juts out perpendicularly away from the suspension beam 112. This extended section of each pivot block 116 is connected to a single fixed swing arm 118 of the pair of swing arms 118 at a fixed swing arm pivot point 119 allowing the fixed swing arm 118 to pivot up and down at the fixed swing arm pivot point 119. Thus, each fixed swing arm 118 is also disposed on either side of the longitudinal axis of the frame 102. The pair of fixed swing arms 118 are also connected to the pair of shock and spring suspensions 120 which control the up and down movement of the first and second wheels 111.

The suspension beam 112 extends from the first wheel 111 to the second wheel 111 and is substantially perpendicular to the longitudinal axis of the frame 102. In the non-limiting embodiments shown, the two suspension tie rods 114 are also pivotally connected to the pair of pivot blocks 116. The suspension tie rods 114 are spaced apart and are parallelly aligned to each other and parallelly aligned to the suspension beam 112. A first suspension tie rod 114 is positioned above the suspension beam 112 and a second suspension tie rod 114 is positioned below the suspension beam 112. In the one or more embodiments, the two suspensions tie rods 114 are only connected to the pivot blocks 116 and thus also extend a length of a space between the pivot blocks 116. Thus, the suspension tie rods 114 can move and pivot with the pivot blocks 116 independently of the suspension beam 112 as the suspension tie rods 114 are not connected to the frame 102 or to the suspension beam 112.

As best seen in FIG. 2, each pivot block 116 is associated with the wheels 111. In other words, a first pivot block 116 corresponds with the first wheel 111 and a second pivot block 116 corresponds with the second wheel 111, wherein both sides are identical and function identically. The pair of fixed swing arms 118 are arranged in a similar manner, a first swing arm 118 is connected to the first wheel 111 and a second swing arm 118 is connected to a second wheel 111, wherein the wheels 111 are on either side of the frame 102. Likewise, a first shock and spring suspension 120 is associated with the first wheel 111, and a second shock and spring suspension 120 is associated with the second wheel 111, wherein both sides are identical.

Referring to one side of the frame 102, with the understanding that the same description corresponds to the other side, the pivot block 116 is pivotally connected to the suspension beam 112 at the block pivot point 108. The pivoting connection allows the pivot block 116 to rotate at the block pivot point 108. This pivoting in turn allows the wheel 111 to rotate with the pivot block 116 through the fixed swing arm 118. The pivot block 116 rotates on the front suspension beam 112, with the block pivot point 108 being at a 90-degree angle to the fixed swing arm pivot point 119, the connection of the fixed swing arm 118 to the pivot block 116. This essentially allows both front wheels 111 to articulate up and down independent of each other or independent of the lean angle on the wheels 111, even at full tilt and full turn, and both front wheels 111 remain parallel to the frame 102 with the suspension beam 112 pivoting at the frame 102. The suspension beam 112 remains parallel to a surface the vehicle 100 is on while the frame 102 leans. The side-to-side leaning movement of the frame 102 and the pivot blocks 116 on each side is coordinated by the two suspension tie rods 114.

Figure 6:
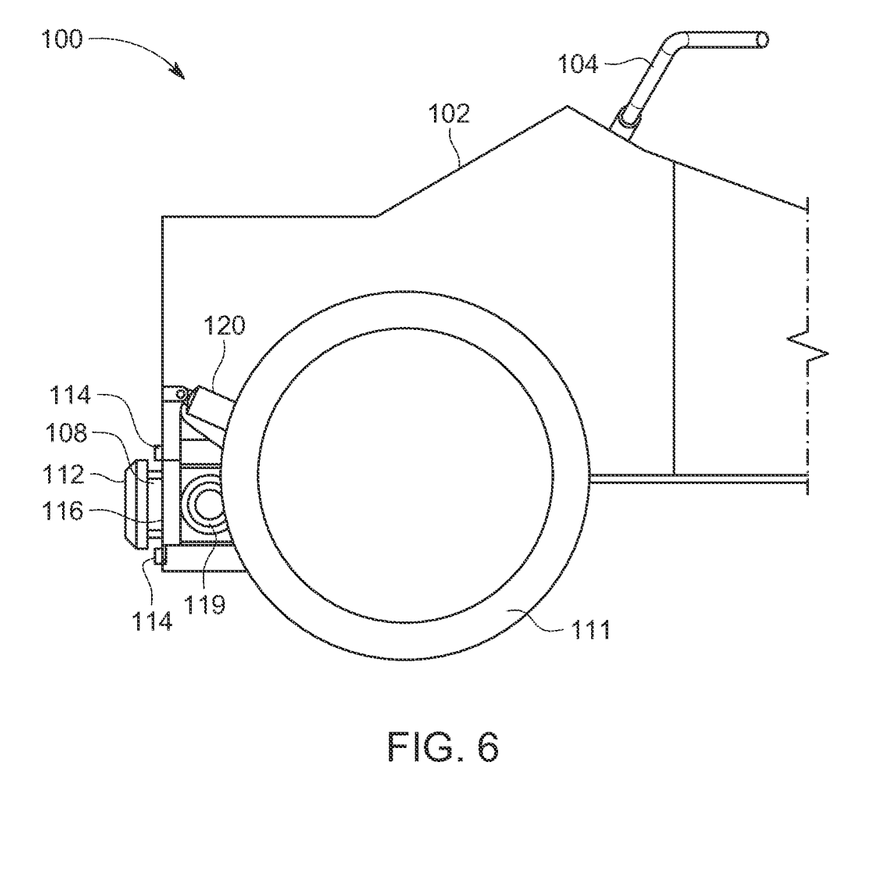
FIG. 6 is a pictorial illustration of a side view of a fixed swing arm of the non-steering assembly connected to a pivot block in accordance with an illustrative embodiment.

Still referring to one side of the non-steering suspension assembly, the fixed swing arm 118 is essentially a straight piece having two ends, wherein a first end of the fixed swing arm 118 is pivotally connected to the pivot block 116 at the fixed swing arm pivot point 119. A second end of the fixed swing arm 118 is connected to a center of the wheel 11. The connection is on an inside facing side (or a side facing the frame 102) of the wheel 111 and the fixed swing arm is fixedly connected to the center of the wheel, so that that the wheel 111 can move up and down with the fixed swing arm 118 pivoting at the fixed swing arm pivot point 119. Additionally, the shock and spring suspension 120 is also connected to a top of the pivot block 116 and to the fixed swing arm 118 to control the up and down movement of the wheel 111. Again, the front swing arm 118 is connected to a center of the front wheel 111 while being capable of articulating at the connection with the pivot block 116, and thus the front wheel 111 can articulate independent of the lean angle on the wheels 111 and the suspension beam 112.

Figure 3:
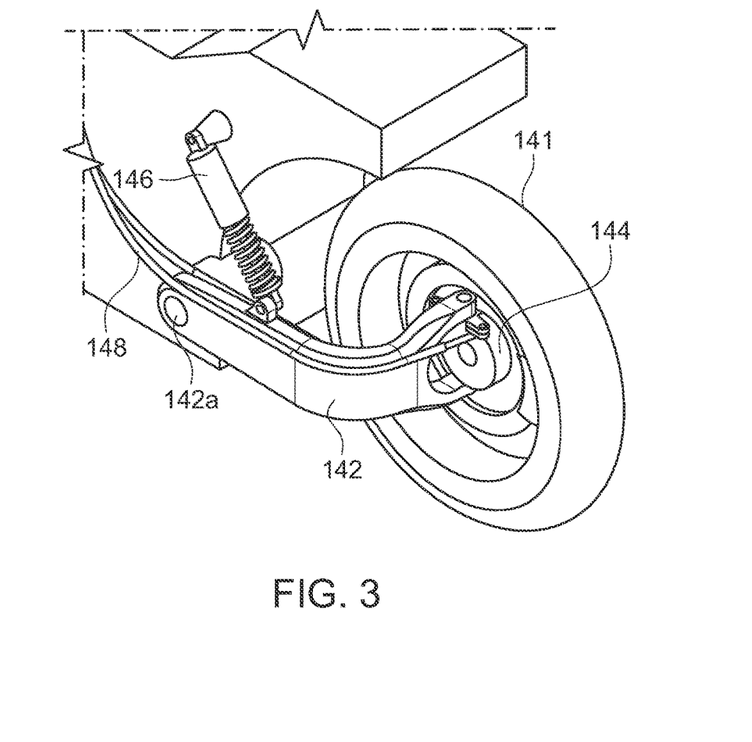
FIG. 3 is a pictorial illustration of a perspective view of the steering suspension assembly in accordance with an illustrative embodiment.
Figure 4:
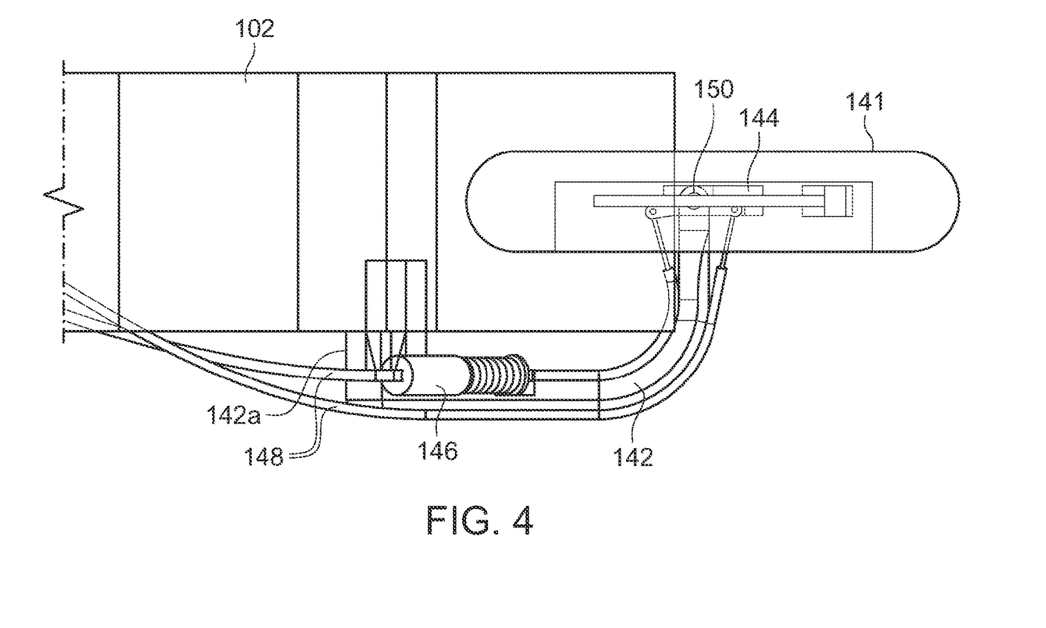
FIG. 4 is a pictorial illustration of a top view of the steering suspension assembly in accordance with an illustrative embodiment.

Referring to FIGS. 1, 3, and 4, the steering suspension assembly includes a steering swing arm 142, a steering hub 144, a third shock and spring suspension 146, and one or more steering cables 148. In this non-limiting embodiment, the steering suspension assembly is associated with back end of the frame and the single third wheel 141. As mentioned above, the components of the steering suspension assembly can replace the non-steering suspension assembly at the front end of the frame 102, wherein the first wheel 111 would connect with a steering suspension assembly and the second wheel 111 would connect with another steering suspension assembly to steer the vehicle, as will be discussed below.

Discussing the setup of the steering suspension assembly, the steering hub 144 is positioned at a center of the third wheel 141, wherein the steering hub 144 may also be defined as a focus of the third wheel 141 adding to the overall structure of the third wheel. The steering swing arm 142 has a first end that that is straight and extends toward a second end that is curved. The second end of the steering swing arm 142 is connected to the steering hub 144 at a hub pivot point 150 such that the third wheel 141 may pivot to steer the vehicle 100. Because the second end of the steering swing arm is curved, the third wheel 141 can turn left and right unobstructed, i.e., the second end or the curved end of the steering swing arm 142 provides enough clearance to the third wheel to turn. The first end of the steering swing arm 142 is pivotally connected to the frame 102 at a steering swing arm pivot point 142a so that the steering swing arm 142 can pivot or articulate upward and downward. Additionally, the third shock and spring suspension 146 is also connected to the steering swing arm 142 and the frame 102 which controls the up and down movement of the steering swing arm 142 along with the rear wheel 141.

In this non-limiting embodiment, the vehicle 100 is configured to be steering from the third wheel 141 at the back end of the frame 102. The steering of the third wheel 141 may be connected by cables 148 from the steering control 104 to the steering hub 144 so that the third wheel 141 may pivot left and right at the hub pivot point 150, which is the connection of the third wheel 141 with the steering swing arm 142. It is also to be understood that the third wheel 141 steering may also be controlled electronically. The steering swing arm 142 is pivotally connected to the frame 102 and the third shock and spring suspension 146, and thus the third wheel 141 articulates upward and downward with the movement of the steering swing arm 142 which is controlled by the third shock and spring suspension 146. As mentioned above, the vehicle can also be configured to be steered by the first and second wheels 111 at the front end of the frame 102. In such, the arrangement and connection of the steering assembly would be associated with the front wheels 111, and the arrangement and connection of the non-steering assembly would be associated with the third wheel. In the case of the single third wheel 141, only one fixed swing arm 118 and one shock and spring suspension 120 would be needed.

Additionally, the vehicle 100 may be contemplated to be a front wheel drive, wherein each of the first and second wheels 111 may include a hub motor 122. The hub motor 122 is a type of motor that is integrated into the wheel (front or rear wheel). It is to be understood that the vehicle 100 may also be an all-wheel drive wherein the first and second wheels 111 and the third wheel 141 are integrated with their own hub motor 122 or alternatively, only the third wheel 141 includes the hub motor 122 for a rear wheel drive. It is also to be understood that a mid-drive motor may instead be installed between a pedal on an e-bicycle which may be contemplated as an implementation of the three-wheeled vehicle 100. In other non-limiting embodiments, the hub motor 122 may be installed on the first and/or second swing arms 118 or the third swing arm 142. Similarly, a brake unit can be installed in one or more of these locations.

The three-wheeled vehicle 100 may be battery powered and include an appropriate battery based on type of vehicle designed (e.g., three-wheel e-bicycle or a three-wheel motorcycle). It is to be understood that variations between the three-wheel vehicle models may involve a combination of different suspension geometry, ground clearance, size and type of tire, type of motor, type of electronics, and other relevant parts. The above description may also apply to a four-wheel vehicle option. The rotation of the pivot block 116 at the front suspension beam 112 would not be needed if the four-wheel vehicle would not be leaning at turns, however, would still include the pivoting of the front swing arm 118 and the pivoting of the rear swing arm 142.

Accordingly, the present description provides for various embodiments for a three-wheeled vehicle 100 that includes a rotating, pivoting front suspension that allows the suspension to articulate independent of lean angle or each other, even at full tilt and full turn, making the three-wheeled vehicle 100 much more stable. Many uses and advantages are offered by three-wheeled vehicle 100 as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A vehicle comprising:
   a frame;
   a first wheel, a second wheel, and a third wheel, wherein the first and second wheels are disposed on either side of a longitudinal axis of a front end of the frame and the third wheel is disposed at a back end of the frame along a center line of the frame;
   a suspension beam pivotally connected to a front end of the frame at a connection point centrally placed along the longitudinal axis of the frame, the suspension beam being perpendicular to the longitudinal axis of the frame and extending an entirety of a width of the front end of the frame including the first wheel and the second wheel;
   a fixed swing arm disposed on each side of the longitudinal axis of the frame, wherein a first fixed swing arm is connected to the first wheel and a second fixed swing arm is connected to the second wheel, wherein the first and second fixed swing arms are indirectly connected to the suspension beam; and
   a steering swing arm connected to the back end of the frame and to the third wheel, wherein the connection to the third wheel allows the third wheel to turn left and right to steer the vehicle.

2. The vehicle of claim 1, wherein the front end of the frame further includes:
   a pivot block disposed on each side of the longitudinal axis of the frame, wherein each pivot block is connected to the suspension beam at a pivot block point;
   the first and second fixed swing arms connected to the pivot block on the respective side of the frame, wherein each fixed swing arm extends to connect with a center of the first wheel and a center of the second wheel on the respective sides of the frame; and
   a shock and spring suspension on each side of the frame, wherein each shock and spring suspension is connected to a top end of the pivot block and to the swing arm on the respective sides of the frame, wherein each shock and spring suspension controls the up and down movement of the respective swing arm.

3. The vehicle of claim 2, wherein a pair of suspension tie rods are pivotally connected to the pivot blocks, a first suspension tie rod and a second suspension tie rod are parallel to each other and to the suspension beam, with the first suspension tie rod positioned above the suspension beam and the second suspension tie rod positioned below the suspension beam.

4. The vehicle of claim 2, wherein each pivot block rotates at the respective block pivot point, whereby the first and second wheels rotate with the respective pivot block through a connection with the fixed swing arm, and the first and second wheels rotate independent of each other.

5. The vehicle of claim 1, wherein a steering control is connected to the third wheel, wherein cables from the steering control are connected to a steering hub at a center of the third wheel.

6. The vehicle of claim 1, wherein the steering swing arm has a straight end and a curved end, where the straight end is pivotally connected to the frame at a steering swing arm pivot point, and the curved end is connected to a steering hub on the third wheel at a hub pivot point, wherein:
   the steering swing arm connected to the third wheel pivots up and down at the third swing arm pivot point; and
   the third wheel turns left and right at the hub pivot point.

7. The vehicle of claim 6, wherein a third shock and spring suspension is connected to the frame and to the steering swing arm, wherein the third shock and spring suspension controls the up and down movement of the steering swing arm and the connected third wheel.

8. The vehicle of claim 1, wherein a hub motor and a brake unit are attached to each of a first and second swing arms at a location proximal to the first and second wheels, respectively.

9. The vehicle of claim 1, wherein a hub motor and a brake unit are attached to a third swing arm at a location proximal to the third wheel.

10. The vehicle of claim 1, wherein the vehicle is battery powered and/or gas powered.

11. The vehicle of claim 1, wherein the vehicle is battery powered and/or gas powered.

12. A vehicle comprising:
    a frame;
    at least three wheels, wherein a first wheel and a second wheel are disposed on each side of a longitudinal axis at a first end of the frame and a third wheel is disposed at a second end of the frame along a center line of the frame, wherein a steering control is connected to the first and second wheels, wherein one or more cables operatively connect the steering control to a steering hub at a center of the first and second wheel;
    a suspension beam pivotally connected to a first end of the frame at a connection point centrally placed along the longitudinal axis of the frame, the suspension beam being perpendicular to the longitudinal axis of the frame and extending an entirety of a width of the first end of the frame including the first wheel and the second wheel;
    a steering swing arm disposed on each side of the longitudinal axis of the frame, wherein a connection of the first steering swing arm to the first wheel and a connection of the second steering swing arm to the second wheel allows the first and second wheels to turn left and right to steer the vehicle, wherein the first and second steering swing arms are indirectly connected to the suspension beam;

a fixed swing arm connected to the second end of the frame and to the third wheel; and wherein the first end and the second end are on opposite ends of the frame along the longitudinal axis of the frame.

13. The vehicle of claim 12, wherein the first end of the frame further includes:

a first pivot block and a second pivot block, wherein the first pivot block connects to the first steering swing arm, the second pivot block connects to the second steering swing arm on each side of the frame, wherein the first and second pivot blocks are connected to the suspension beam at a first and second block pivot points, respectively;

wherein the first steering swing arm extends to connect with a center of the first wheel and the second steering swing arm extends to connect with a center of the second wheel, wherein each of the first and second steering swing arm has a straight end and a curved end, where the straight end is pivotally connected to the respective pivot block and the curved end is connected to a steering hub on the respective first and second wheel at a hub pivot point; and a first shock and spring suspension and a second shock and spring suspension, wherein the first shock and spring suspension is connected to a top end of the first pivot block and to the first steering swing arm, the second shock and spring suspension is connected to a top end of the second pivot block and to the second steering swing arm, wherein the first and second shock and spring suspensions control the up and down movement of the first and second swing arms independently of each other.

14. The vehicle of claim 13, wherein a pair of suspension tie rods are pivotally connected to the first and second pivot blocks, wherein the pair of suspension tie rods are parallel to each other and to the suspension beam, with a first suspension tie rod positioned above the suspension beam and a second suspension tie rod positioned below the suspension beam.

15. The vehicle of claim 13, wherein the first and second pivot blocks rotate at the respective first and second block pivot points, whereby the first and second wheels rotate with the first and second pivot blocks, and the first and second wheels rotate independent of each other.

16. The vehicle of claim 11, wherein the fixed swing arm is pivotally connected to the second end of the frame and connected to a center of the third wheel, wherein the third wheel pivots up and down at the connection of the fixed arm to the frame.

17. The vehicle of claim 16, wherein a shock and spring suspension is connected to the frame and the fixed swing arm, wherein the shock and spring suspension controls the up and down movement of the fixed swing arm and the connected third wheel.

18. The vehicle of claim 11, wherein a hub motor and a brake unit are attached to each of the first and second steering swing arms at a location proximal to the first and second wheels, respectively.

19. The vehicle of claim 11, wherein a hub motor and a brake unit are attached to the fixed swing arm at a location proximal to the third wheel.

\* \* \* \* \*